United States Patent
Mackie et al.

(10) Patent No.: US 10,505,868 B2
(45) Date of Patent: *Dec. 10, 2019

(54) NETWORK DEVICE DATA PLANE SANDBOXES FOR THIRD-PARTY CONTROLLED PACKET FORWARDING PATHS

(71) Applicant: Juniper Networks, Inc., Sunnyvale, CA (US)

(72) Inventors: Scott Mackie, Santa Cruz, CA (US); Andrzej Szyszko, Holden, MA (US); Nitin Kumar, Fremont, CA (US); Timothy L. Patrick, Los Gatos, CA (US); Surya Chandra Sekhar Nimmagadda, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,966

(22) Filed: Mar. 12, 2018

(65) Prior Publication Data
US 2018/0205670 A1    Jul. 19, 2018

Related U.S. Application Data

(63) Continuation of application No. 14/944,113, filed on Nov. 17, 2015, now Pat. No. 9,967,210.

(51) Int. Cl.
*H04L 12/935* (2013.01)
*H04L 12/721* (2013.01)
(Continued)

(52) U.S. Cl.
CPC .............. *H04L 49/30* (2013.01); *H04L 12/28* (2013.01); *H04L 12/56* (2013.01); *H04L 12/66* (2013.01);
(Continued)

(58) Field of Classification Search
CPC .................. H04L 49/30; H04L 45/72
See application file for complete search history.

(56) References Cited

U.S. PATENT DOCUMENTS 7,215,637 B1    5/2007    Ferguson et al.
7,649,904 B1    1/2010    Ghosh et al.
(Continued)

FOREIGN PATENT DOCUMENTS

CN    104021167 B    9/2014
EP    1154601    11/2001

OTHER PUBLICATIONS

Intent to Grant dated Apr. 5, 2018, from counterpart European Application No. 16199346.4, 43 pp.
(Continued)

*Primary Examiner* — Luat Phung
(74) *Attorney, Agent, or Firm* — Shumaker & Sieffert, P.A.

(57) ABSTRACT

In some examples, a network device comprises a first application and a second application; a forwarding unit comprising an interface card to receive a packet; a packet processor; an internal forwarding path of the forwarding unit; a forwarding unit processor; a first interface; and a second interface. The first application is configured to configure, via the first interface, the internal forwarding path to include a sandbox that comprises a container for instructions to be configured inline within the internal forwarding path. The second application is configured to configure, via the second interface, the sandbox with second instructions that determine processing of packets within the sandbox. The packet processor is configured to process, in response to determining a packet received by the forwarding unit is associated with a packet flow controlled at least in part by (Continued)

the second application, the packet by executing the second instructions configured for the sandbox.

20 Claims, 6 Drawing Sheets

(51) Int. Cl.
*H04L 12/28* (2006.01)
*H04L 12/54* (2013.01)
*H04L 12/66* (2006.01)
*H04L 12/24* (2006.01)

(52) U.S. Cl.
CPC .......... *H04L 41/0803* (2013.01); *H04L 41/12* (2013.01); *H04L 45/72* (2013.01)

(56) References Cited

U.S. PATENT DOCUMENTS

| | | | |
|---|---|---|---|
| 7,990,993 | B1 | 8/2011 | Ghosh et al. |
| 8,806,058 | B1 | 8/2014 | Mackie et al. |
| 9,106,581 | B1 | 8/2015 | Mackie et al. |
| 9,742,668 | B1 | 8/2017 | Mackie et al. |
| 9,967,210 | B2 | 5/2018 | Mackie et al. |
| 2008/0044181 | A1 | 2/2008 | Sindhu |
| 2008/0151893 | A1 | 6/2008 | Nordmark et al. |
| 2009/0003375 | A1 | 1/2009 | Havemann et al. |
| 2013/0223442 | A1 | 8/2013 | Narayanan et al. |
| 2014/0254466 | A1* | 9/2014 | Wurster ................ H04L 12/189 370/312 |
| 2016/0029153 | A1* | 1/2016 | Linn ..................... H04W 4/008 455/41.1 |

OTHER PUBLICATIONS

Examination Report from counterpart European Application No. 18188662.3, dated Sep. 27, 2018, 6 pp.
Extended Search Report from counterpart European Application No. 16199346.4, dated Jun. 20, 2017, 6 pp.
Response to Extended Search Report dated Jun. 20, 2017, from counterpart European Application No. 16199346A, filed Jan. 19, 2018, 13 pp.
Invitation Pursuant to Article 63(1) EPC from counterpart European Application No. 16199346.4, dated Mar. 28, 2018, 4 pp.
Response to Invitation Pursuant to Article 63(1) EPC dated Mar. 28, 2018, from counterpart European Application No. 16199346.4, filed May 25, 2017, 3 pp.
Prosecution History from U.S. Pat. No. 9,967,210, dated May 19, 2017 through Mar. 19, 2018, 43 pp.
Response to Extended Search Report dated Sep. 27, 2018, from counterpart European Application No. 18188662.3, filed Jul. 12, 2019, 15 pp.
Office Action received in counterpart CN Application No. 201610991565.X, dated Jul. 23, 2019, 7 pp.

* cited by examiner

NETWORK DEVICE DATA PLANE SANDBOXES FOR THIRD-PARTY CONTROLLED PACKET FORWARDING PATHS

This application is a continuation of U.S. application Ser. No. 14/944,113, filed Nov. 17, 2015, the entire contents of which is hereby incorporated by reference.

TECHNICAL FIELD

The invention relates to packet-based computer networks and, more particularly, to processing packets within computer network devices.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and forwarding components for routing or switching data units. In some cases, for example, a network device may include a plurality of packet processors and a switch fabric that collectively provide a forwarding plane for forwarding network traffic.

The control plane functions provided by the control unit include storing network topologies in the form of a routing information base (RIB), executing routing protocols to communicate with peer routing devices to maintain and update the RIB, and providing a management interface to allow user access and configuration of the network device. The control unit maintains routing information that represents the overall topology of the network and defines routes to destination prefixes within the network.

The control unit derives a forwarding information base (FIB) that includes a number of forwarding structures generated by the control unit in accordance with the routing information and control information. The control unit installs the forwarding structures within the data plane to programmatically configure the forwarding components. The data and instructions that constitute the forwarding structures define an internal forwarding path for each incoming packet received by the network device. For example, to generate a route table lookup forwarding structure, the control unit selects routes defined by the network topology and maps packet key information (e.g., destination information and other select information from a packet header) to one or more specific next hop network devices and ultimately to one or more specific output interfaces of interface cards of the network device. In some cases, the control unit may install the forwarding structures into each of the packet processors to update the FIB within each of the packet processors and control traffic forwarding within the data plane. Bifurcating control and data plane functionality allows the one or more FIBs in the data plane to be updated without degrading packet forwarding performance of the network device.

SUMMARY

In general, the disclosure describes techniques for facilitating constrained third-party access to an internal packet forwarding path of a network device data plane. For example, a network device forwarding path may be configured with one or more "sandboxes" that each demarcates independent, parallel, and asynchronous forwarding path logic within the overall forwarding path. While the overall forwarding path is managed and configured by native applications and processes, which execute in the network device control plane and are developed by the network device manufacturer to manage operations of the network device, the native applications may configure within the overall forwarding path one or more sandboxes. Configuration of the forwarding path logic within the sandbox is delegated to one or more applications developed by a third party ("third-party applications") that are not developed by the network device manufacturer and over which the network device manufacturer has little or no control.

Once configured within a packet processor (e.g., forwarding integrated circuit) of a data plane of the network device, a sandbox may present to the third party application an independent, isolated, virtual packet processor within the packet processor in such a way that the third party application has complete control of operations performed by forwarding logic within the established confines of the sandbox. To enforce isolation, a sandbox may be configured by the native applications with well-defined input and output interfaces by which packets ingress and egress, respectively, from/to the overall forwarding path of the packet processor of the network device.

In some examples, a packet processor driver that configures the forwarding path in response to receiving instructions from control plane applications exposes separate interfaces to the applications: a native interface that offers the full suite of packet processing operations for the forwarding path, and a sandbox interface that offers a reduced set of packet processing operations for the forwarding path. The native interface allows native applications of the network device to configure the overall forwarding path, including configuring one or more sandboxes, using any of the packet processing operations made available by the packet processor. The sandbox interface enables the third-party applications to configure the sandbox with packet processing operations drawn from the reduced set of packet processing operations. The reduced set of packet processing operations offered by the sandbox interface in this way constrains the types of operations permitted for application to packet flows processed by the sandbox, but facilitates complete control of the sandbox by the third-party applications.

The described techniques may provide one or more advantages. For example, isolating the sandbox within the overall forwarding path may safeguard the sandbox forwarding logic from the rest of the forwarding path forwarding logic, and vice-versa. Further, decoupling control of the sandbox from native applications reduces, and at least in some cases eliminates, configuration dependencies in the forwarding logic between a sandbox and the rest of the forwarding path such that the sandbox and the rest of the forwarding path may be configured and executed as parallel and asynchronous elements.

Moreover, in some instances, a reduced set of packet processing operations offered by a sandbox interface may constrain the types of operations executable within the sandbox to, among other things, prevent sandbox forwarding logic from "jumping" out of the sandbox and thereby restrict egress of packet processing operations to the well-defined egress ports configured by the native applications. The reduced set of operations in this way further facilitates isolation of the sandbox. As another example advantage, the native applications may constrain the amount of resources available to a sandbox by configuring, e.g., in accordance with a configuration prescribed by a network device operator, the sandbox with a specified resource limit. This may prevent a third-party application from exhausting forwarding path resources due to misconfiguration, software problems, or malicious attacks on the network device or third-party application/controller.

In one example, a method comprises configuring, by a first application executed by a control plane of a network device and via a first interface executed by a forwarding unit of the network device, an internal forwarding path of the forwarding unit with first instructions that determine processing of packets received by the forwarding unit, wherein the first application configures the internal forwarding path to include a sandbox that comprises a container for instructions to be configured inline within the internal forwarding path, and wherein at least a portion of the internal forwarding path is stored to a memory of the forwarding unit and is executable by a packet processor of the forwarding unit. The method also comprises configuring, by a second application executed by the control plane of the network device and via a second interface executed by the forwarding unit of the network device, the sandbox with second instructions that determine processing of packets within the sandbox. The method also comprises processing, by the packet processor in response to determining a packet received by the forwarding unit is associated with a packet flow controlled at least in part by the second application, the packet by executing the second instructions configured for the sandbox.

In another example, a network device comprises a control plane configured to execute a first application and a second application; and a forwarding unit comprising: an interface card configured to receive a packet; a packet processor operably coupled to a memory; an internal forwarding path, wherein at least a portion of the internal forwarding path is stored to the memory and is executable by the packet processor; a forwarding unit processor; and a first interface and a second interface configured for execution by the forwarding unit processor, wherein the first application is configured to configure, via the first interface, the internal forwarding path to include a sandbox that comprises a container for instructions to be configured inline within the internal forwarding path, wherein the second application is configured to configure, via the second interface, the sandbox with second instructions that determine processing of packets within the sandbox, and wherein the packet processor is configured to process, in response to determining a packet received by the forwarding unit is associated with a packet flow controlled at least in part by the second application, the packet by executing the second instructions configured for the sandbox.

In another example, a non-transitory computer-readable medium comprises instructions for causing one or more programmable processors of a network device to: configure, by a first application configured for execution by a control plane of a network device and via a first interface configured for execution by a forwarding unit of the network device, an internal forwarding path of the forwarding unit with first instructions that determine processing of packets received by the forwarding unit, wherein the first application configures the internal forwarding path to include a sandbox that comprises a container for instructions to be configured inline within the internal forwarding path, and wherein at least a portion of the internal forwarding path is stored to a memory of the forwarding unit and is executable by a packet processor of the forwarding unit, wherein the packet processor is a programmable processor of the one or more programmable processors; configure, by a second application configured for execution by the control plane of the network device and via a second interface configured for execution by the forwarding unit of the network device, the sandbox with second instructions that determine processing of packets within the sandbox; and process, by the packet processor in response to determining a packet received by the forwarding unit is associated with a packet flow controlled at least in part by the second application, the packet by executing the second instructions configured for the sandbox.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
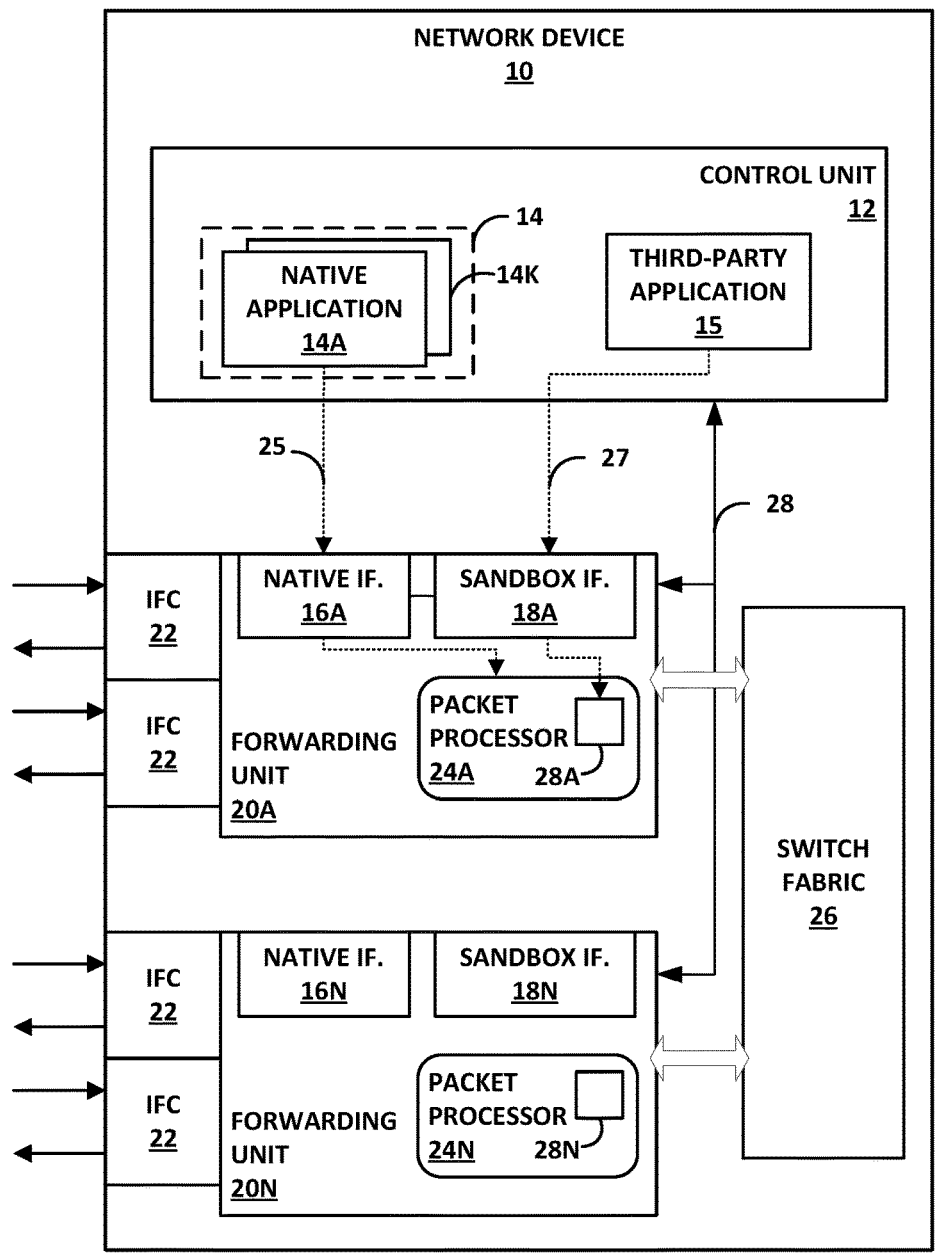
FIG. 1 is a block diagram illustrating an example network device in which a data plane sandbox is configured, according to techniques described herein.

FIG. 1 is a block diagram illustrating an example network device in which a data plane sandbox is configured, according to techniques described herein. Network device 10 may comprise a router such as a provider edge or customer edge router, a core router, or another type of network device, such as a switch. In this example, network device 10 includes a control unit 12 that provides control plane functionality for the device. Network device 10 also includes a plurality of forwarding units 20A-20N ("forwarding units 20") and a switch fabric 26 that together provide a data plane for processing network traffic. Forwarding units 20 receive and send data packets via interfaces of interface cards 22A-22N ("IFCs 22") each associated with a respective one of forwarding units 20. Each of forwarding units 20 and its associated ones of IFCs 22 may represent a separate line card insertable within a chassis (not shown) of network device 10. Example line cards include flexible programmable integrated circuit (PIC) concentrators (FPCs), dense port concentrators (DPCs), and modular port concentrators (MPCs). Each of IFCs 22 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 20 may comprise more or fewer IFCs. Switch fabric 26 provides a high-speed interconnect among forwarding units 20 for forwarding incoming data packets to an egress forwarding unit of forwarding units 20 for output over a network that includes network device 10.

Control unit 12 is connected to each of forwarding units 20 by internal communication link 28. Internal communication link 28 may comprise a 100 Mbps Ethernet connection, for instance. Control unit 12 configures, by sending instructions and other configuration data via internal communication link 28, forwarding units 20 to define the packet processing operations applied to packets received by forwarding units 20.

Control unit 12 executes a plurality of applications, including native applications 14A-14K ("native applications 14") and a third-party application 15. Each of the applications may represent a separate process managed by a control unit operating system. Native applications 14 may represent user-level processes that are developed and deployed by the manufacturer of the network device 10. As such, native applications 14 are "native" to the network device 10 in that the development of the applications is carefully managed by the manufacturer to facilitate secure, robust, and predictable operation of the network device 10, such operation defined at least in part according to a configuration specified by an operator (e.g., a service provider, enterprise, or other customer of the network device 10 manufacturer). Native applications 14 may run network management software, execute routing protocols to communicate with peer routing devices, maintain and update one or more routing tables, and create one or more forwarding tables for installation to forwarding units 20, among other functions.

Third-party application 15 represents an application that configures sandboxes 28 via sandbox interfaces 18. The "third-party" typically is an operator of the network device 10 and is not the manufacturer of the network device 10. However, application 15 need not necessarily be developed by a third party and may in some cases be, e.g., an application developed by the manufacturer of the network device 10. In some cases, third-party application 15 presents an external API by which external controllers, such as software-defined networking controllers and network management systems, may send data representing packet processing operations to be performed by forwarding units 20. In such cases, third-party application 15 operates as an interface to the network device 10 data plane for the external controllers.

Control unit 12 may include one or more processors (not shown in FIG. 1) that execute software instructions, such as those used to define a software or computer program, stored to a computer-readable storage medium (again, not shown in FIG. 1), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 12 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 20 includes at least one packet processor 24 that processes packets by performing a series of operations on each packet over respective internal packet forwarding paths as the packets traverse the internal architecture of network device 10. Packet processor 24A of forwarding unit 20A, for instance, includes one or more configurable hardware chips (e.g., a chipset) that, when configured by applications executing on control unit 12, define the operations to be performed by packets received by forwarding unit 20. Each chipset may in some examples represent a "packet forwarding engine" (PFE). Each chipset may include different chips each having a specialized function, such as queuing, buffering, interfacing, and lookup/packet processing. Each of the chips may represent ASIC-based, FPGA-based, or other programmable hardware logic.

Operations may be performed, for example, on each packet by any of a corresponding ingress interface, an ingress forwarding unit 20, an egress forwarding unit 20, an egress interface or other components of network device 10 to which the packet is directed prior to egress, such as one or more service cards. Packet processors 24 process packets to identify packet properties and perform actions bound to the properties. Each of packet processors 24 includes forwarding structures that, when executed, cause the packet processor to examine the contents of each packet (or another packet property, e.g., incoming interface) and on that basis make forwarding decisions, apply filters, and/or perform accounting, management, traffic analysis, and load balancing, for example. In one example, each of packet processors 24 arranges forwarding structures as next hop data that can be chained together as a series of "hops" along an internal packet forwarding path for the network device. The result of packet processing determines the manner in which a packet is forwarded or otherwise processed by packet processors 24 of forwarding units 20 from its input interface on one of IFCs 22 to its output interface on one of IFCs 22.

In many instances, the forwarding structures perform lookup operations, such as a tree (or trie) search, a table (or index) search, a filter determination and application, or a rate limiter determination and application. Lookup operations locate, within a lookup data structure (e.g., a lookup tree), an item that matches packet contents or another property of the packet or packet flow, such as the inbound interface of the packet.

Applications configured for execution by control unit 12 determine the packet processing operations to be applied to packets by packet processors 24. Applications configure the packet processors 24 to perform the packet processing operations by sending, to forwarding units 20, data representing the packet processing operations. Such data may include abstract forwarding structures representing high-level packet processing requirements (e.g., route lookup and filtering). Packet processing operations may include fundamental packet forwarding operations such as input packet processing, route lookup, and output packet processing, as well as service functions such as packet filtering or access control, statistical sampling, traffic policing, rate limiting, and accounting.

Forwarding units 20 translate the data representing the packet processing operations received from applications into forwarding structures, or "next hops", that include instructions executable by respective packet processors 24 and stores the forwarding structures to a memory (not shown in FIG. 1). Packet processors 24 execute the forwarding structures to process received packets to satisfy the high-level packet processing requirements provided by the application. In this way, the applications inject higher-level representations of routes and next-hops (operations) into the stream of configurable forwarding state that is stored by packet processors and that defines, at least in part, the packet processing operations for execution by packet processors 24. Because forwarding structures may resolve to other forwarding structures, forwarding structures may be chained together to define a set of packet processing operations for a given packet and form a "forwarding path" for that packet. The set of forwarding structures and forwarding state for execution and use by packet processors 24 may therefore alternatively be referred to as the forwarding path.

In accordance with techniques described in this disclosure, packet processors 24 may each be configured with one or more sandboxes 28. Each of packet processors 24 may facilitate similar and concurrent sandbox functionality with respect to the techniques of this disclosure, said functionality being described hereinafter primarily with respect to packet processor 24A.

Native applications 14 send sandbox configuration data 25 to native interface 16A of forwarding unit 20A to configure sandbox 28A for packet processor 24A. Sandbox configuration data 25 may include data specifying a sandbox identifier for sandbox 28A, an amount of resources allocated for sandbox 28A, and port mappings for sandbox 28A. Sandbox 28A represents independent, parallel, and asynchronous forwarding path logic for packet processor 28A that is exposed for configuration by third-party application 15 via sandbox interface 18A. While the overall forwarding path for packet processor 28A is managed and configured by native applications 14, the native applications 14 may configure a sandbox 28A such that configuration of the sandbox forwarding logic within the overall forwarding path is delegated to third-party application 15. Third-party application 15 sends data representing packet processing operations to sandbox interface 18A, which translates packet processing operations into instructions executable by respective packet processors 24 and stores the instructions to the memory. Although only one sandbox 28A for packet processor 24A is illustrated, packet processor 24A may be configured with multiple independent sandboxes.

Sandbox 28A represents a container for instructions to be configured inline within the internal forwarding path for packet processor 24A. In some examples, sandbox 28A is a "logical" container in that instructions are "inside" sandbox 28A if configured by sandbox interface 18A to be within sandbox 28A as part of the internal forwarding path for packet processor 28A. Sandbox 28A may in such examples present to the third-party application 15 an independent, isolated, virtual packet processor within the packet processor 24A in such a way that the third party has complete control of operations performed by the sandbox 28A logic within the established confines of the sandbox 28A.

In other examples, sandbox 28A may represent a physically separate packet processor in the form of forwarding logic physically separate from the main packet processor 28A and from forwarding path 66. In such examples, sandbox 28A may read instructions from a physically separate memory that defines the forwarding path for sandbox 28A. Sandbox 28A may in such examples present to the third-party application 15 an independent, isolated, packet processor inline with the forwarding path 66 for the packet processor 24A in such a way that the third party has complete control of operations performed by the sandbox 28A logic within the physically separate confines of the sandbox 28A.

Forwarding unit 20A executes separate interfaces for configuring the packet processor to perform packet processing operations. Native interface 16A (illustrated as "native if. 16A" in FIG. 1) enables native applications 14 to configure packet processor 24A with the full suite of available packet processing operations, which may include indexed or longest-prefix match lookups, conditionals, packet rewrites, filtering, accounting, and other operations. Native interface 16A also enables native applications 14 to configure, for packet processor 24A, the specification and location of sandbox 28A within the forwarding path for packet processor 24A.

Sandbox interface 18A provides third-party application 15 with control over the packet processing operations that occur "within" the sandbox 28A. That is, sandbox interface 18A may install forwarding structures that are associated with the sandbox 28A in such manner as to be isolated and independent from other forwarding structures for packet processor 24A. Sandbox interface 18A restricts the scope of forwarding structures installed to sandbox 28A such that the forwarding structures installed to sandbox 28A do not resolve (or "jump") to other forwarding structures in the forwarding path that are not associated with the sandbox. Similarly, native interface 16A restricts the scope of forwarding structures installed other than to sandbox 28A such that the forwarding structures do not resolve to any forwarding structures in the forwarding path that are associated with sandbox 28A.

Native interface 16A may provide sandbox interface 18A with the sandbox identifier and location for sandbox 28A. Third-party application 15 sends configuration data 27 including data representing packet processing operations to sandbox interface 18A, which causes forwarding unit 20A to translates the packet processing operations into instructions executable by respective packet processors 24 and store the instructions to the memory for execution by packet processor 24A. Configuration data 27 may include the sandbox identifier 28A, which sandbox interface 18A uses to facilitate isolation to sandbox 28A of the instructions for the packet processing operations represented in configuration data 27. In some cases, native interface 16A and sandbox interface 18A may be executed by control unit 12 and install forwarding structures to packets processors 24 via internal communication link 28.

In some examples, native interface 16A offers the full suite of packet processing operations for the forwarding path, while sandbox interface 18A offers a reduced set of packet processing operations for the forwarding path. Native interface 16A in such cases allows native applications 14 to configure the overall forwarding path, including configuring sandbox 28A, using any of the packet processing operations made available by the packet processor 24A. The sandbox interface 18A enables third-party application 15 to configure the sandbox 28A with packet processing operations drawn from the reduced set of packet processing operations offered by the sandbox interface 18A. The reduced set of packet processing operations offered by the sandbox interface 18A in this way constrains the types of operations permitted for application to packet flows processed by sandbox 18A, but facilitates complete control of the sandbox 28A by third-party application 15.

Packet processor 24A executes forwarding structures installed via native interface 16A and sandbox interface 18A, including sandbox 28A having forwarding structures configured entirely by sandbox interface 18A, to process packets received by forwarding unit 20A.

Configuring a sandbox 28A within the overall forwarding path for packet processor 24A may provide one or more advantages. Whereas end-user (customer) applications using OpenFlow, P4, or other frameworks for programming the data plane using forwarding information generated by an external controller are driving the requirement to enable access to the data plane to customers, granting third-party access to a forwarding path having millions of interconnected instructions, in flux and often managed by a single-threaded program to prevent corruption and avoid access locks, may have limitations and result in undesirable data plane operation. For example, implementations of third-party access to the forwarding path that do not use a sandbox and instead provide common access to a common interface for configuring packet processor 24A, e.g., may make in-the-field debugging difficult due to common access to the entire forwarding path making it difficult to distinguish forwarding state/instructions that are managed by native applications and forwarding state/instructions that are managed by an external controller. In other words, injection of undifferentiated forwarding state by native applications and third-party applications/controllers makes it difficult to allocate ownership of any given forwarding structure and determine where a given operational issue with the data plane is originating.

In addition, providing programmatic access to external management APIs, such as OpenFlow and P4, may require adapting the native interface or providing a middleware interface to match the external management API. Because external controllers often require very simple constructs, it may be difficult to adapt the interface to support these external management APIs.

Moreover, while native application 14 are developed by the manufacturer of network device 10 and operationally tightly-coupled to facilitate security and reliability, increasing third-party access to the forwarding paths for packet processors 24 could leave the router open to serious operational issues in the forwarding path due to, e.g., a configuration error, software issue with the third-party application/controller, or even a malicious attack.

As described herein, configuring a sandbox 28A within the overall forwarding path for packet processor 24A may provide well-designed and structured access to the forwarding path in order to sustainably support third-party application 15 and, e.g., external management APIs such as OpenFlow and P4. Isolating the sandbox 28A within the overall forwarding path may safeguard the sandbox 28A forwarding logic from the rest of the forwarding path forwarding logic, and vice-versa. Further, decoupling control of the sandbox 28A from native applications 14 reduces, and at least in some cases eliminates, configuration dependencies in the forwarding logic between sandbox 28A and the rest of the forwarding path such that the sandbox 28A and the rest of the forwarding path may be configured and executed as parallel and asynchronous elements.

Moreover, in some instances, a reduced set of packet processing operations offered by sandbox interface 18A may constrain the types of operations executable within the sandbox 28A to, among other things, prevent sandbox 28A forwarding logic from "jumping" out of the sandbox 28A and thereby restrict egress of packet processing operations to a well-defined sandbox egresses configured and deterministically managed by the native applications 14. The reduced set of operations in this way further facilitates isolation of the sandbox 28A. As another example advantage, the native applications 14 may constrain the amount of resources available to a sandbox by configuring, e.g., in accordance with a configuration prescribed by a network device operator, the sandbox 28A with a specified resource limit. This may prevent a third-party application 15 from exhausting forwarding path resources due to misconfiguration, software problems, or malicious attacks on the network device 10 or third-party application 15 or external controller.

Figure 2:
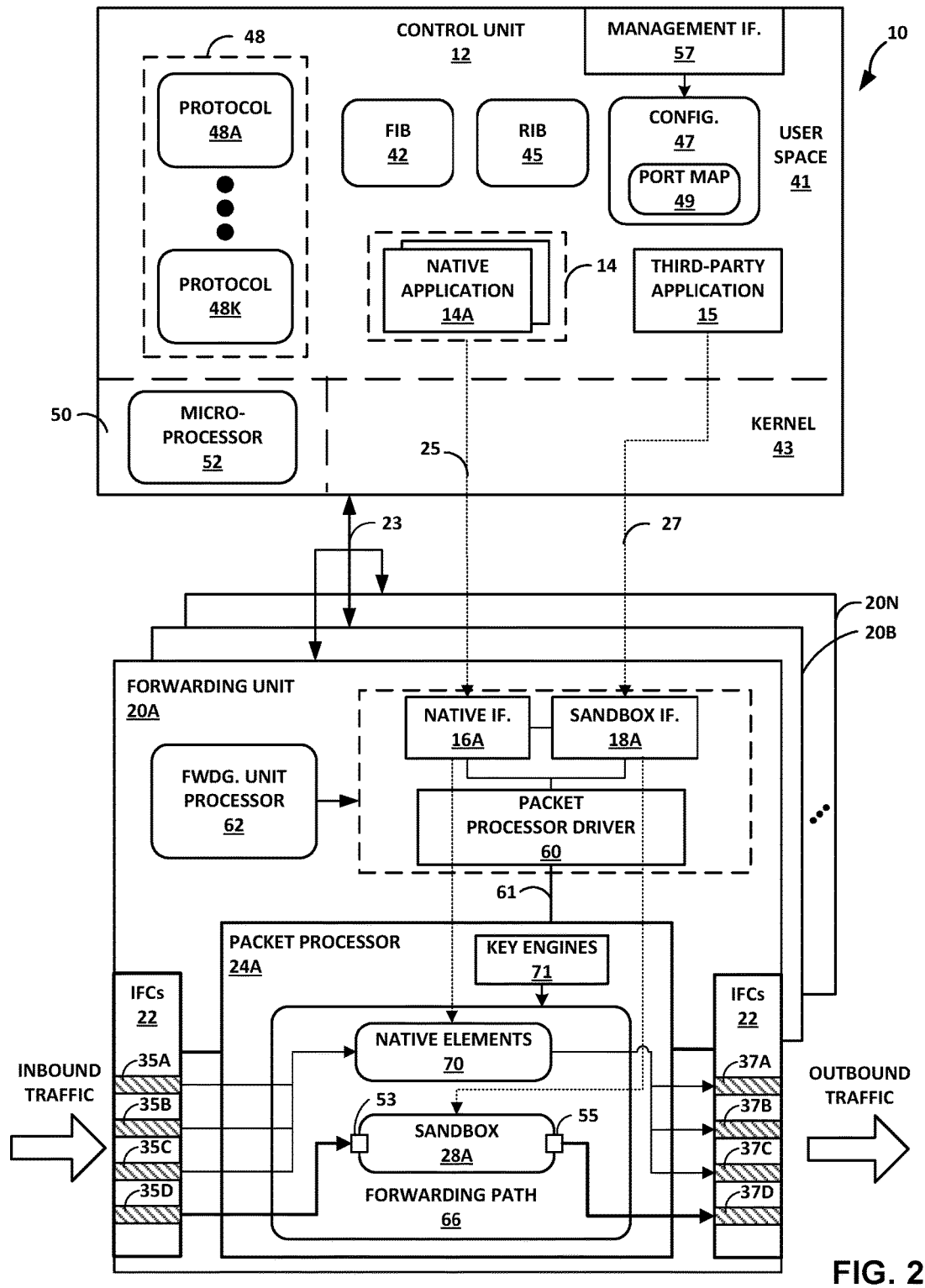
FIG. 2 is a block diagram illustrating an example instance of the network device of FIG. 1 in further detail.

FIG. 2 is a block diagram illustrating, in further detail, an example network device in which a data plane sandbox is configured, according to techniques described herein. Network device 10 illustrated in FIG. 2 may represent an example instance of network device 10 of FIG. 1.

In this example, control unit 12 includes a combination of hardware and software that provides a control plane operating environment for execution of various user-level host applications executing in user space 41. By way of example, host applications may include a third-party application 15, a management interface process 57 having a command-line interface and/or graphical user interface process to receive and respond to administrative directives, a routing protocol process of native applications 14 to execute one or more routing protocols of protocols 48A-48K (collectively, "protocols 48"), a network management process of native applications 14 to execute one or more network management protocols of protocols, an ARP process of native applications 14 to respond to ARP requests according the ARP protocol of protocols 48, a subscriber management process of native applications 14 to manage subscriber session setup and maintenance in accordance with one or more subscriber session management protocols (e.g., GPRS Tunneling Protocol-C(ontrol)), and so forth. In this respect, control unit 12 may provide routing plane, service plane, and management plane functionality for network device 10.

Native applications 14, third-party application 15, and management interface 57 execute on and interact with kernel 43, which provides a run-time operating environment for user-level processes. Kernel 43 may represent, for example, a UNIX operating system derivative such as Linux or Berkeley Software Distribution (BSD). Kernel 43 offers libraries and drivers by which user-level processes may interact with the underlying system. Hardware environment 50 of control unit 12 includes microprocessor 52 that executes program instructions loaded into a main memory (not shown in FIG. 2) from a storage device (also not shown in FIG. 2) in order to execute the software stack, including both kernel 43 and user space 41, of control unit 12. Microprocessor 52 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, a routing protocol process of native applications 14 executes one or more interior and/or exterior routing protocols to exchange routing information with other network devices and store received routing information in routing information base 45 ("RIB 45"). RIB 45 may include information defining a topology of a network, including one or more routing tables and/or link-state databases. The routing protocol process resolves the topology defined by routing information in RIB 45 to select or determine one or more active routes through the network and then installs these routes to forwarding information base 42 ("FIB 42"). Typically, the routing protocol process generates FIB 42 in the form of a radix or other lookup tree to map packet information (e.g., header information having destination information and/or a label stack) to next hops and ultimately to interface ports of interface cards associated with respective forwarding units 20A-20N. Each of forwarding units 20 may be programmed with a different FIB.

Network device 10 also includes a plurality of forwarding units 20A-20N (collectively, "forwarding units 20") and a switch fabric (not shown) that together provide a data plane for forwarding network traffic. Forwarding units 20 connect to control unit 12 in this example by communication links 23, which may represent an Ethernet network.

Each of forwarding units 20 may include substantially similar components performing substantially similar functionality, said components and functionality being described hereinafter primarily with respect to forwarding unit 20A illustrated in detail in FIG. 2. Forwarding unit 20A of FIG. 2 may illustrate, in further detail, an example of forwarding unit 20A of FIG. 1. Forwarding unit 20A receives and sends network packets via inbound interfaces 35 and outbound interfaces 37, respectively, of interface cards (IFCs) 22 of forwarding unit 20A. Forwarding unit 20A also includes packet processor 24A, which represents hardware or a combination of hardware and software that provide high-speed forwarding of network traffic. Likewise, forwarding unit 20B includes packet processor 24B, and so on. In some examples, one or more of forwarding units 20 may each include multiple forwarding components substantially similar to packet processor 24A.

Each of IFCs 22 may include interfaces for various combinations of layer two (L2) technologies, including Ethernet, Gigabit Ethernet (GigE), and Synchronous Optical Networking (SONET) interfaces. In various aspects, each of forwarding units 20 may include more or fewer IFCs. In some examples, each of packet processors 24 is associated with different IFCs of the forwarding unit on which the packet processor is located. The switch fabric (again, not shown in FIG. 2) connecting forwarding units 20 provides a high-speed interconnect for forwarding incoming transit network packets to the selected one of forwarding units 20 for output over one of IFCs 22.

Network device 10 may in some instances represent a multi-chassis router, and the switch fabric may include a multi-stage switch fabric, such as a 3-stage Clos switch fabric, that relays packet-switched communications and circuit-switched communications between the routing nodes of the multi-chassis router via optical interconnects using multiplexed communications. Such a multi-chassis router that employs optical interconnects using multiplexed communications is described in U.S. Publication No. 2008/0044181, entitled MULTI-CHASSIS ROUTER WITH MULTIPLEXED OPTICAL INTERCONNECTS, filed on Aug. 1, 2007, the entire contents of which are incorporated by reference herein.

Forwarding units 20A-20N of network device 10 demarcate control plane and data plane of network device 10. That is, forwarding unit 20A performs control plane and data plane functionality. In general, packet processor 24A and IFCs 22 implement a data plane for forwarding unit 20A, while forwarding unit processor 62 (illustrated as "fwdg. unit processor 62") executes software including native interface 16, sandbox interface 18A, and packet processor driver 60 that implement portions of the network device 10 control plane within forwarding unit 20A. Control unit 12 also implements portions of the control plane of network device 10. Forwarding unit processor 62 of forwarding unit 20A manages packet processor 24A and executes instructions to provide interfaces to control unit 12 and handle host-bound or other local network packets (such as packets that include Options Field values or TTL-expired packets). Forwarding unit processor 62 may execute a microkernel for forwarding unit 20A. The microkernel executed by forwarding unit processor 62 may provide a multi-threaded execution environment for executing native interface 16, sandbox interface 18A, and packet processor driver 60.

Packet processor 24A may include programmable ASIC-based, FPGA-based, or other types of packet processors that process network packets by performing a series of operations on each packet over respective internal packet forwarding paths as the packets traverse the internal architecture of network device 10. Packet processor 24A includes forwarding structures that, when executed, examine the contents of each packet (or another packet property, e.g., incoming interface) and on that basis make forwarding decisions, apply filters, and/or perform accounting, management, traffic analysis, and load balancing, for example. In one example, packet processor 24A arranges forwarding structures as next hop data that can be chained together as a series of "next hops" along an internal packet forwarding path 66 for the packet processor 24A. The result of packet processing determines the manner in which a packet is forwarded or otherwise processed by packet processors 24 from its input interface on an ingress forwarding unit of forwarding units 20 to its output interface on an egress forwarding unit of forwarding units 20.

Packet processor 24A identifies packet properties and performs actions bound to the properties. One or more key engines 71 of packet processor 24A execute microcode (or "microinstructions") to control and apply fixed hardware components of the forwarding path to process packet "keys." A packet key includes packet fields and other parameters that determine a flow of packet processing for the packet along an internal forwarding path. Internal forwarding path 66 ("forwarding path 66") may represent a computer-readable storage medium, such as random access memory, and comprises forwarding path elements in the form of programmable, executable microcode and fixed hardware components that determine the packet processing actions and other operations performed by packet processor 24A. Forwarding path 66 may include, for example, executable instructions, programmable logic, and application-specific logic that perform lookups, rate limit packet flows (e.g., using policers), and manipulate packet keys, among other functions. Forwarding path elements may include primitives such as lookup tables and lookup trees, along with rate limiters, policers, counters, firewalls, and other elements.

Internal forwarding paths of network device 10 may include combinations of respective forwarding paths 66 of multiple different packet processors 24. In other words, forwarding path 66 of packet processor 24A may include only a part of the overall internal forwarding path of network device 10. Control unit 12 may configure forwarding path 66 of packet processor 24A to identify host-bound network packets and forward such packets toward control unit 12. For example, control unit 12 may program filters that include a network address of a network device 10 and direct packet processor 24A to forward network packets having a destination address that matches the network address toward control unit 12.

In some examples, packet processor 24A binds actions to be performed on packets received by the packet processor 24A to identification of one or more properties of the packets. That is, upon identifying certain packet properties, packet processor 24A performs the action bound to the properties. Packet properties may include packet metadata such as a particular packet's ingress interface or egress interface (as determined by the PFEs) as well as information carried by the packet and packet header, such as packet header fields, destination route prefixes, layer four (L4) or Transport Layer protocol destination ports, and the packet payload. Actions bound to packet characteristics may include count, discard, forward to a specified next-hop or interface, filter, sample, rate limit, and Quality of Service (QoS) marking, differential services (DiffServ), load balance, intrusion detection and prevention, L2 class of service (CoS), and L2 or L2 Virtual Private Network (L2VPN) switching.

Each of key engines 71 includes one or more key buffers to store packet field data for corresponding packets that the key engine is currently processing. Key buffers may also provide limited writable memory to which elements of the internal forwarding path may write to pass messages accessible by future elements. In some cases, according to techniques described herein, packet metadata may include an identifier for a sandbox to indicate that a packet should be processed with the identified sandbox. For example, a packet bound to an interface that resolves to a sandbox may cause the packet processor 24A to add the sandbox identifier to the packet metadata and so indicate to key engines 71 that the packet should be processed with the sandbox. In some cases, a packet that is to be processed by a sandbox may be internally forwarded among forwarding units 20. Intermediate and egress forwarding units 20 may use the sandbox identifier in the packet metadata to ensure that the identified sandbox is used to process the packet.

Primitives of forwarding path 66 include data structures having entries, or "items," that correspond to packet key values and bind the values to actions to be performed by key engines 71 executing forwarding path 66. In this respect, primitives represent a tightly-coupled combination of executable instructions that correspond to bound actions and of data for possible packet key values. A tree lookup one of primitives may perform a longest-match prefix lookup in a routing table or search a list of prefixes in a filter program. A table lookup one of primitives may determine whether another one of primitives should be performed by key engines 71. For example, a key engine 71 may perform a table lookup of packet properties to determine that key engines 71 should further perform a tree lookup to identify an outbound interface for the packet. Packet processor 24A may store primitives and forwarding structures (e.g., instructions) in computer-readable storage media, such as static random access memory (SRAM). While illustrated within packet processor 24A, primitives and forwarding structures may be stored in memory external to packet processor 24A onboard forwarding unit 20A.

In some aspects, actions of forwarding path 66 use a next hop data structure to initiate processing. At the end of each processing step by one of key engines 71, such as execution of one of a primitive or forwarding structure, the result is a next hop that may specify additional processing or the termination of processing, for instance. In addition, next hops may specify one or more functions to be executed by key engines 71. Example next hop functions include policing (i.e., rate limiting), counting, and sampling. Next hops thus form the primary data structure that can be used to initiate a lookup or another next hop, chain lookups and next hops to allow for multiple lookup and other operations to be performed on a single packet, and terminate a lookup. Key engines 71 may be associated with respective result (or "lookup") buffers that store results for executing next hops.

For example, a key engine 71 may execute a lookup specified by a next hop and store the result of the lookup to the associated result buffer. The contents of a result buffer may affect the actions of the next hop in the next hop chain. Additional information regarding next hops and next hop chaining is available in PLATFORM-INDEPENDENT CONTROL PLANE AND LOWER-LEVEL DERIVATION OF FORWARDING STRUCTURES, U.S. application Ser. No. 12/266,298, filed Nov. 6, 2008, which is incorporated herein by reference in its entirety. Example details of a network router in which a control plane programs a forwarding plane with forwarding structures are described in U.S. patent application Ser. No. 13/194,571, filed Jul. 29, 2011, and entitled PACKET FORWARDING PATH PROGRAMMING USING A HIGH-LEVEL DESCRIPTION LANGUAGE; and in U.S. Pat. No. 7,215,637, issued May 8, 2007, and entitled SYSTEMS AND METHODS FOR PROCESSING PACKETS, the entire contents of each of which are incorporated herein by reference.

Forwarding unit 20A receives inbound network traffic by IFCs 22, and packet processor 24A processes network traffic using internal forwarding path 66. Packet processor 24A looks up outbound interfaces for and forwards transit network packets that are neither host-bound nor otherwise require a response of logical decision by the control plane as outbound traffic via outbound interfaces 37.

Forwarding unit 20A executes software and presents interfaces to control unit 12 for configuring forwarding path 66. Packet processor driver 60 (hereinafter, "driver 60"), configured for execution by forwarding unit processor 62, configures forwarding path 66 with forwarding path elements for execution by packet processor 24A. Forwarding path elements may include instructions executable by packet processor 24A. More specifically, driver 60 may receive data 27 representing packet processing operations and translate data 27 to executable instructions that the driver 60 installs to forwarding path 66 as interconnected forwarding path elements to dynamically generate the forwarding path 66 for packets received by forwarding unit 20A.

In accordance with techniques described herein, driver 60 is configured to facilitate configuration of forwarding path 66 by multiple different clients by enabling independent, parallel, and asynchronous forwarding path logic (sandbox 28A) within the overall forwarding path. Driver 60 presents separate interfaces, native interface 16A and sandbox interface 18A, that enable decoupling of the control of sandbox 28A from native applications 14. In this way, sandbox 28A represents a logical container for instructions to be configured, by third-party application 15 via sandbox interface 18A, inline within the internal forwarding path for packet processor 24A. This decoupling may foster independence of the sandbox 28A logic from native elements 70 configured by native applications 14 and may also facilitate parallel control plane configuration of native elements 70 and sandbox 28A. Via native interface 16A, native applications 14 configure sandbox 28A in accordance with configuration data 47 (illustrated as "config. 47") received via management interface 57. Configuration data 47 for sandbox 28A may specify a port mapping/binding for the sandbox 28A and, in some cases, a size for the sandbox 28A. The size may be specified as a percentage or other relative size indicia for forwarding path 66 resources (e.g., memory size), or may be specified in absolute terms (e.g., in bytes). In the example of FIG. 2, port map 49 maps sandbox 28A ports to interfaces 37, 39 of IFCs 22.

The following is an example of configuration data 47 for two sandboxes, "red" and "blue":

```
forwarding-options sandbox {
    red {
        maximum-size 10%;
        ports {
            p0 {
                xe-0/0/0
            }
            p1 {
                xe-0/0/1
            }
        }
    }
    blue {
        maximum-size 5%;
        ports {
            p0 {
                xe-3/0/1
            }
            p1 {
                xe-3/0/2
            }
            p3 {
                xe-0/0/2
            }
        }
    }
}
```

In the above example, sandbox "red" has a maximum-size specified as 10% of the forwarding path 66 resources. Sandbox "red" has a port p0 bound to interface xe-0/0/0 and a port p1 bound to interface xe-0/0/1. Sandbox blue has a maximum-size specified as 10% of the forwarding path 66 resources. Sandbox blue has a port p0 bound to interface xe-3/0/1, port p1 bound to interface xe-3/0/2, and port p3 bound to interface xe-0/0/2. The ports container of the above example configuration data may represent example data for port map 49, which represents a table, list, or other data structure to associate virtual ports of sandbox 28A with physical interfaces 35, 37 of IFCs 22.

In some cases, sandboxes "red" and "blue" may be managed by respective clients, which attach to sandbox interface 18A and manage their sandbox by invoking the name of the sandbox, e.g., "red". If the identified sandbox has been configured by native applications 14, the client may receive a sandbox context with the configured ports defined and attached. If the operator reconfigures ports for the sandbox in the configuration data 47, ports will disappear or appear from the sandbox. This is similar to a hot swap. Driver 60 may configure Sandbox 28A presents an independent forwarding engine to third-party application 15. Driver 60 manages forwarding path 66 such that the point of contact between sandbox 28A and the remaining instructions of forwarding path 66 (e.g., native elements 70) is under the control of native applications 14 and is deterministically managed. Specifically, driver 60 in accordance with configuration data 25 for configuring sandbox 28A, configures ingress ports 53 and egress ports 55 for the sandbox 28A. Ingress ports 53 represent one or more virtual ports for the sandbox 28A by which instructions of forwarding path 66 may resolve to sandbox 28A and in this way ingress packet processing to sandbox 28A. Driver 60 may ensure that native elements 70 do not resolve to any instructions of sandbox 28A other than by ingress ports 53. In the above example configuration data, sandbox "red" has ports bound directly to physical interfaces 35, 37 of IFCs 22, such that packets arriving on any of these bound physical ports ingress to sandbox 28A via ingress ports 53 and are processed by sandbox 28A instructions.

Egress ports 55 represent one or more virtual ports for sandbox 28A by which instructions of sandbox 28 resolve to native elements 70 that are not associated with sandbox 28 and in this way egress packet processing from sandbox 28A. Driver 60 may ensure that instructions of sandbox 28A do not resolve to any of native elements 70 other than by egress ports 55. In the above example configuration data, sandbox "red" has ports bound directly to physical interfaces 35, 37 of IFCs 22, such that packets egressing from the sandbox ports egress from the "red" sandbox to the physical port bound to the sandbox egress port.

In some examples, ingress ports 53 and egress ports 55 represent indirect next hops controlled by native applications 14 to facilitate a managed point of contact and dependency between the rest of forwarding path 66 and sandbox 28A. That is, packets ingress and egress via the ingress ports 53 and egress ports 55, respectively, that each represents an indirect next hop. In general, an indirect next hop is an intermediate data structure that references a next hop. Lookup data structures such as lookup tables and lookup trees may resolve to an indirect next hop of an ingress port 53. In this way, native applications 14 may configure the forwarding path 66 to have a well-defined ingress to sandbox 28A that is controlled by native applications 14. By modifying the reference within the indirect next hop for the ingress port 53, driver 60 can specify a next hop within sandbox 28A. In this way, third-party application 15 may specify the forwarding path from the ingress port 53 to the rest of sandbox 28A. By providing native applications 14 and third-party application 15 with control of each "side" of the indirect next hop, as it were, the techniques of this disclosure facilitate the sandbox demarcation. Similarly with respect to egress ports 55, but with the managing parties switched, elements of sandbox 28A may resolve to an indirect next hop that represents one of egress ports 55. By modifying the reference within the indirect next hop for the egress port 55, native applications 14 may specify the forwarding path from the egress port 55 to the rest of forwarding path 66 or output to one of ports 37.

In some examples, the set of packet processing operations offered by sandbox interface 18A does not include each of the packet processing operations offered by native interface 16A. For instance, sandbox interface 18A may offer more limited packet processing operations for packet reception and transmission by the network device 10. In some cases, sandbox 28A may be configured solely to enable traffic routing confirmation by third-party application 15 but offer no facilities for packet reception and transmission by network device. For instance, sandbox interface 18A may offer the ability to configure, in sandbox 28A, a label match table that results in outbound labels being manipulated and then ejected to a respective port. Sandbox interface 18A may not offer the ability to configure sandbox 28A to receive packets, e.g., host-bound traffic, directly. In other words, sandbox interface 18A may facilitate basic forwarding support for building a table lookup and resultant next hops in sandbox 28A but few or no facilities for packet reception. In this way, sandbox interface 18A may enforce a constraint for causing all host-bound traffic to be processed by native elements 70, e.g., by sending to native applications 14. Sandbox interface 18A may also enforce the constraint for preventing any host-originating traffic from being injected by third-party application 15 to sandbox 28A. To enforce the constraint, in some examples, sandbox 18A does not offer packet match reception (i.e., the ability to indicate to the hardware that the packet is to be received and sent to the control plane) is prevented from building any such request.

As another example, sandbox interface 18A may not offer the packet processing operations relating to packet rewriting. While sandbox interface 18A may permit reclassifying some metadata for the packet lookup (for example, changing the QoS characteristics or tagging a packet for accounting), sandbox 28A in such cases would not have access to the packet itself. This feature set may allow third-parties to do "deeper" classification of packets but not to alter their basic flow through the forwarding path 66.

In some cases, sandbox interface 18A may be configurable to dynamically change the types of packet processing operations available on a per-client basis. In other words, sandboxes within forwarding path 66 may have different sets of packet processing operations available to them. In general, however, sandbox 28A would have feature sets that are reduced from what is possible in packet processor 24A.

Sandbox interface 18A may be highly restrictive with respect to certain packet processing operations. For example, sandbox interface 18A may not in any case permit configuring physical port setup that is done hardware or provide access to any of the embedded microcode features such as in-line keep-alive management. The operations may be strictly reserved to native applications 14 configuring forwarding path 66 via native interface 16A.

Figure 3:
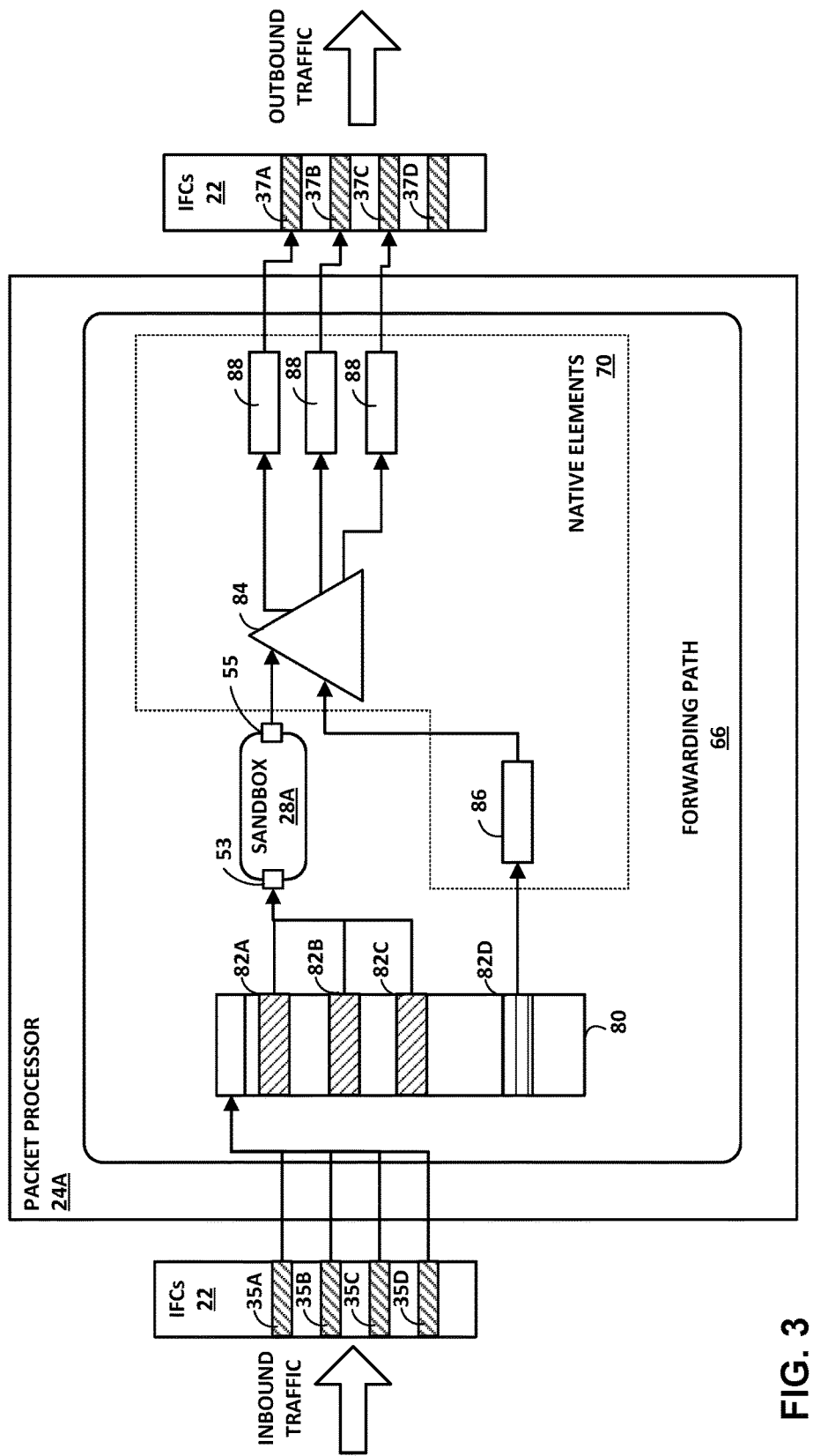
FIG. 3 is a block diagram illustrating aspects of a network device data plane having a forwarding path sandbox configured in accordance with techniques described in this disclosure.

FIG. 3 is a block diagram illustrating aspects of a network device data plane having a forwarding path sandbox configured in accordance with techniques described in this disclosure. In this example, logical inbound interfaces 82A-82C of logical interface lookup table 80 are bound to ingress ports 53 of sandbox 28A. Each of logical inbound interfaces 82A-82D ("logical inbound interfaces 82") may represent a logical layer 2 or layer 3 interface that matches, using packet identifying information, packets received on any of inbound interfaces 35 and defines the forwarding paths for the matched packets. In some contexts, a logical layer 2 interface is referred to as an "IFD" and a logical layer 3 interface is referred to as an "IFL" or "IFF".

In the illustrated example, packets that match any of logical inbound interfaces 82A-82C jump to sandbox 28A via ingress ports 53, and packet processor 24A processes such packets using sandbox 28A. Contrariwise, packets that match any of logical inbound interface 82D jump to native elements 70 (in particular element 86), and packet processor 24A does not process such packets with sandbox 28A. Logical inbound interfaces 82 may in this way be configured to direct to sandbox 28A those packets to be processed by sandbox 28A, e.g., packets of packet flows associated with a client for third-party application 15.

In this example, egress ports 55 of sandbox 28A resolve to native elements 70 according to a "firewall mode" for sandboxes. In this mode, packet lookup and routing is configured by native applications 14 and occurs earlier or subsequent in the processing path 66 to packet processing operations executed in sandbox 28A. In this model, the sandbox 28A may have a single input and at least one output, depending on the application. Sandbox 28A is bound into forwarding path 66 at a specific position in the ingress or egress forwarding path. Firewall mode facilitates sandbox functionality similar to that provided by a smart and dynamic firewall, which third-party application 15 may use to manipulate and filter traffic within sandbox 28A prior to or subsequent to packet lookup and routing.

In another mode ("port-interface mapped mode"), as illustrated and described above with respect to FIG. 2, ingress ports 53 and egress ports 55 of sandbox 28A are bound to specific interfaces. In this mode, sandbox 28A is conceptually a mini-router or mini-switch configurable by third-party application 15 via sandbox interface 18A. This mode may be particular useful for SDN applications, such as OpenFlow and P4 applications.

Figure 4:
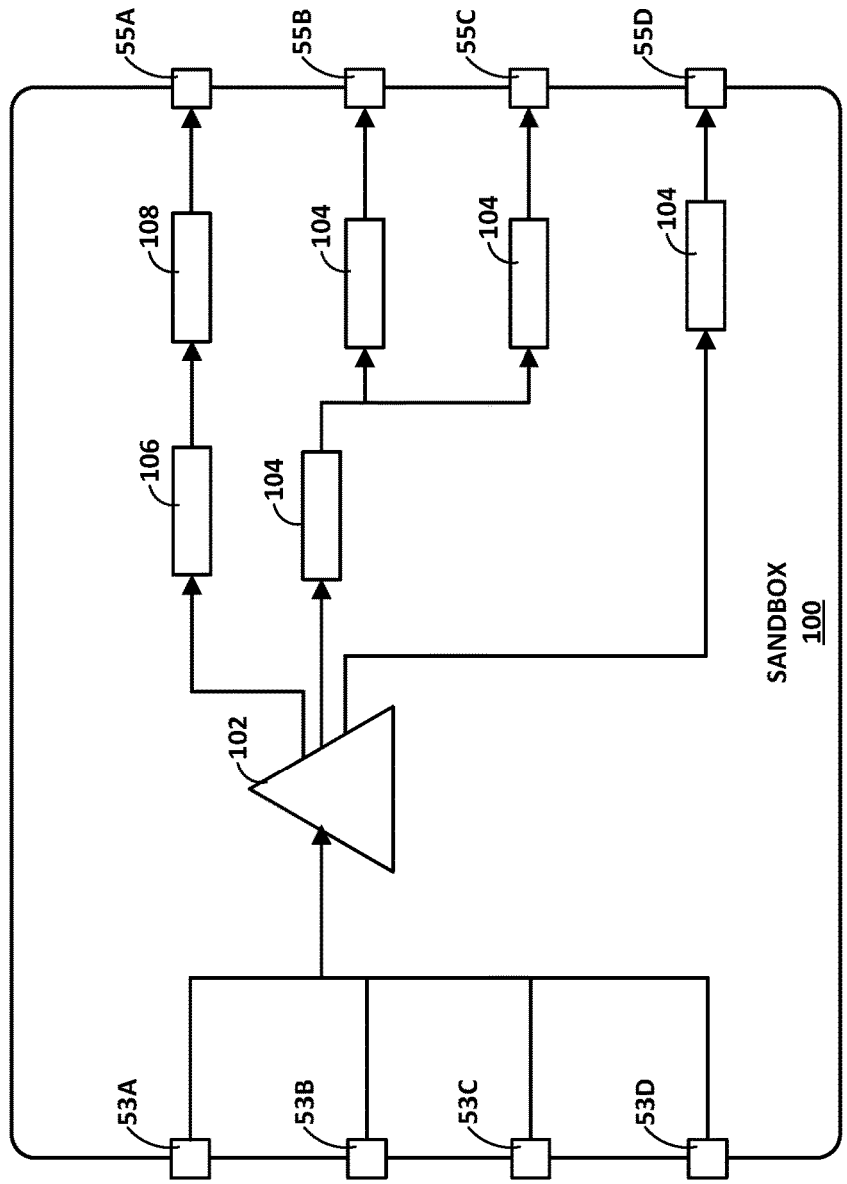
FIG. 4 is a block diagram illustrating, in further detail, an example sandbox configured in accordance with techniques described in this disclosure.

FIG. 4 is a block diagram illustrating, in further detail, an example sandbox configured in accordance with techniques described in this disclosure. Sandbox 100 may represent an example instance of sandbox 28A of any of FIGS. 1-3. Sandbox 100 includes ingress ports 53A-53D and egress ports 55A-55D. Sandbox 100 includes a lookup tree 102 in the form of a radix or other lookup tree to map packet information (e.g., header information having destination information and/or a label stack) to next hops 104, 106, and ultimately to outbound interfaces of interface cards 22 associated with forwarding units 20. Next hops 104, 106, and 108 represent forwarding path elements as described herein.

Figure 5:
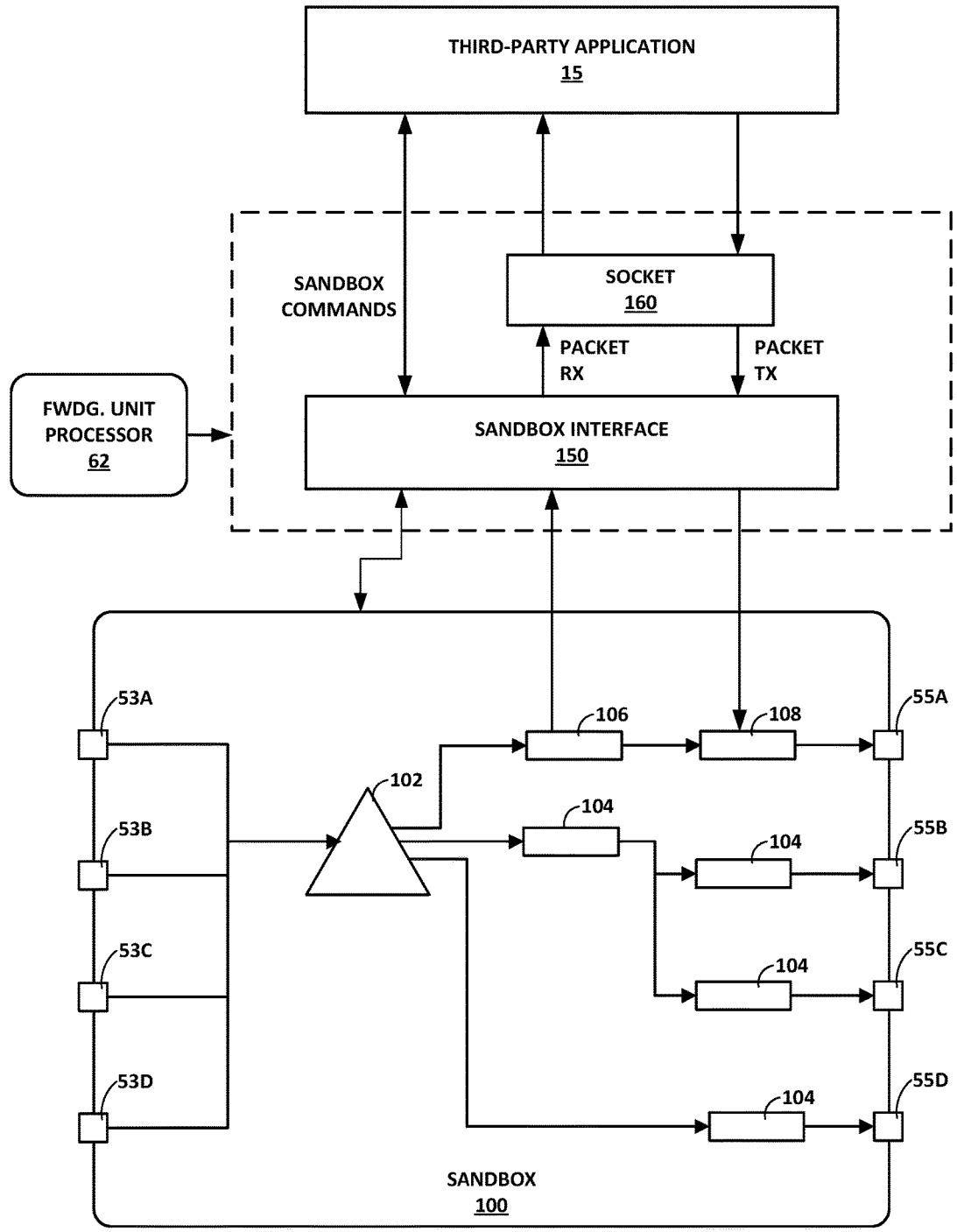
FIG. 5 is a block diagram illustrating components of a network device configured according to techniques described in this disclosure.

FIG. 5 is a block diagram illustrating components of a network device configured according to techniques described in this disclosure. Sandbox interface 150 may represent an example instance of sandbox interface 18A of FIGS. 1-3. Sandbox interface 150 in this example enables third-party application to configure sandbox 100 to flag packets for local reception. Sandbox interface 150 also operates as a packet interface to send packets flagged for local reception to third-party application 15 via socket 160. Socket 160 may represent a Linux/BSD or other network socket associated with the sandbox 100 context.

Third-party application 15 may invoke sandbox interface 150 to configure sandbox 100 with match-and-receive forwarding instructions in order to redirect traffic to an external software handler. In the illustrated example, element 106 represents a match-and-receive next hop that directs matching packets to sandbox interface 150 for transmission to third-party application 15 via socket 160.

Packets for re-injection in the forwarding path by third-party application 15 may be inserted back into the forwarding path at sandbox 100 in a similar manner. In the illustrated example, element 108 represent a next hop that enables sandbox interface 150 to receive a packet from third-part application 15 via socket 160. This may enable the transmission of packets from a sandbox client to be monitored and controlled by the sandbox 100 also controlled by the client.

Local receipt and transmission via sockets bound to sandboxes may facilitate a lightweight method for third parties to chain services in the forwarding path without requiring any modifications to native applications 14 to configure such chaining. The third parties may use the above techniques to perform service processing inline within the forwarding path and, by cascading multiple sandboxes, may direct packets along a service chain having service nodes (e.g., applications, virtual machines, and appliances) reachable by sockets bound to respective sandboxes. For example, sandbox 100 may redirect packets to socket 150 for service handling, such as IPSEC processing, firewall, network address translation, transmission control protocol (TCP) proxying, and other network services.

Figure 6:
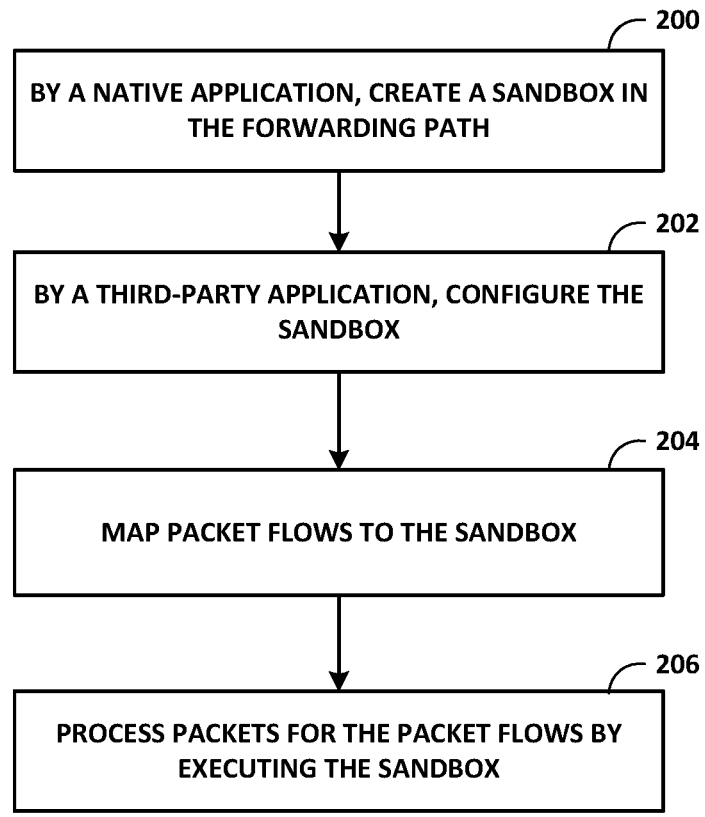
FIG. 6 is a flow chart illustrating an example mode of operation for a network device for configuring and using a data plane sandbox according to techniques described in this disclosure.

FIG. 6 is a flow chart illustrating an example mode of operation for a network device for configuring and using a data plane sandbox according to techniques described in this disclosure. For illustrative purposes, this mode of operation is described with respect to network device of FIG. 2.

In accordance with configuration data 47 received from an operator of network device 10, a native application 14 executing on the control unit 12 creates sandbox 28A by sending native interface 16A configuration data 25, which may specify an identifier, an indication of allocated resources, and location sandbox 28A. Native interface 16A creates the sandbox 28A in forwarding path 66 according to the configuration data 25 (200). Native interface 16A may provide some of configuration data 25 to sandbox interface 18A for use in sandbox 28A configuration. Subsequently, third-party application 15 uses a reference to sandbox 28A to send data 27 representing packet processing operations to sandbox interface 18A, which generates instructions for realizing the packet processing operations and installs the instructions to the sandbox 28A (202). Native applications 14 further configures forwarding path 66 to map packets flows to the sandbox 28A (204). For example, native applications 14 may map select inbound interfaces 35 or logical interfaces to an ingress port 53 of sandbox 28A. Alternatively, native applications 14 may configure a next hop in forwarding path 66 that resolves to an ingress port 53 of sandbox 28A. As such, packet processor 24A processes packet flows received on/matching such interfaces using the sandbox 28A. In some examples, such packet flows may be associated with the third-party customer that configures sandbox 28A to constrain sandbox operation to those packet flows that are associated with the third-party customer and third-party application 15. Packet processor 24A processes packets received by forwarding unit 20A and mapped to the sandbox 24A by executing sandbox 24A (206).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

What is claimed is:

1. A method comprising:
configuring, by a first application executed by a control plane of a network device and via a first interface executed by a forwarding unit of the network device, an internal forwarding path of the forwarding unit with a sandbox that comprises a container for instructions to be configured inline within the internal forwarding path, and
wherein at least a portion of the internal forwarding path is stored to a memory of the forwarding unit and is executable by a packet processor of the forwarding unit;
configuring, by the first application, a socket for the sandbox;
configuring, by a second application executed by the control plane of the network device and via a second interface executed by the forwarding unit of the network device, the sandbox with instructions for the sandbox; and
processing, by the packet processor, a packet received by the forwarding unit using the instructions for the sandbox to cause the forwarding unit to send the packet to the second application via the socket.

2. The method of claim 1, further comprising:
processing, by the second application, the packet to obtain a processed packet; and
sending, by the second application, the processed packet to the forwarding unit via the socket.

3. The method of claim 1, wherein the packet comprises a first packet, the method further comprising:
receiving, by the packet processor from the second application and via the socket, a second packet; and
processing, by the packet processor, the second packet using the instructions for the sandbox.

4. The method of claim 1, wherein the socket comprises a network socket.

5. The method of claim 1,
wherein the instructions for the sandbox comprise a match-and-receive instruction, and
wherein processing the packet received by the forwarding unit using the instructions for the sandbox comprises:
determining, by the packet processor, the packet matches the match-and-receive instruction;
sending, by the forwarding unit in response to the determining, the packet to the second application via the socket.

6. The method of claim 1, further comprising:
sending, by the second interface of the forwarding unit, the packet to the second application via the socket.

7. The method of claim 1, further comprising:
executing, by a forwarding unit processor of the forwarding unit, the second interface and the socket.

8. The method of claim 1, wherein the second application applies, to the packet, a service of at least one service chain.

9. The method of claim 1, wherein the forwarding unit comprises a line card insertable within a chassis of the network device.

10. The method of claim 1, wherein configuring the internal forwarding path with the sandbox comprises configuring, by the first application, an ingress port for the sandbox that defines a virtual port by which at least one instruction of the internal forwarding path resolves to the sandbox.

11. The method of claim 10, further comprising:
configuring, by the first application, the internal forwarding path to map a logical inbound interface of the forwarding unit to the ingress port for the sandbox,
wherein processing the packet received by the forwarding unit using the instructions for the sandbox comprises processing, by the packet processor in response to determining the packet is received by the forwarding unit at the inbound logical interface, the packet using the instructions for the sandbox.

12. The method of claim 10,
wherein the ingress port comprises an indirect next hop that includes a reference,
wherein configuring the ingress port comprises storing, by the first interface, the indirect next hop to the memory,
wherein configuring the sandbox with the instructions for the sandbox comprises configuring, by the second interface, the reference of the indirect next hop to reference a forwarding path element configured in the sandbox.

13. The method of claim 1, wherein configuring the internal forwarding path with the sandbox comprises configuring, by the first application, an egress port for the sandbox that defines a virtual port by which at least one instruction of the internal forwarding path resolve to exit the sandbox.

14. A network device comprising:
a control plane configured to execute a first application and a second application; and
a forwarding unit comprising:
an interface card;
a packet processor operably coupled to a memory;
an internal forwarding path, wherein at least a portion of the internal forwarding path is stored to the memory and is executable by the packet processor;
a forwarding unit processor; and
a first interface and a second interface configured for execution by the forwarding unit processor,
wherein the first application is configured to configure, via the first interface, the internal forwarding path with a sandbox that comprises a container for instructions to be configured inline within the internal forwarding path,
wherein the first application is configured to configure a socket for the sandbox,
wherein the second application is configured to configure, via the second interface, the sandbox with instructions for the sandbox, and
wherein the packet processor is configured to process a packet received by the interface card using the instructions for the sandbox to cause the forwarding unit to send the packet to the second application via the socket.

15. The network device of claim 14,
wherein the second application is configured to process the packet to obtain a processed packet; and
wherein the second application is configured to send the processed packet to the forwarding unit via the socket.

16. The network device of claim 14,
wherein the packet comprises a first packet,
wherein the packet processor is configured to receive, from the second application and via the socket, a second packet, and
wherein the packet processor is configured to process the second packet using the instructions for the sandbox.

17. The network device of claim 14, wherein to configure the internal forwarding path with the sandbox the first application is configured to configure an ingress port for the sandbox that defines a virtual port by which at least one instruction of the internal forwarding path resolves to the sandbox.

18. The network device of claim 14,
wherein the first application is configured to configure the internal forwarding path to map a logical inbound interface of the forwarding unit to the ingress port for the sandbox,
wherein to process the packet received by the forwarding unit using the instructions for the sandbox, the packet processor is configured to process, in response to a determination the packet is received by the forwarding unit at the inbound logical interface, the packet using the instructions for the sandbox.

19. The network device of claim 14, wherein the forwarding unit comprises a line card insertable within a chassis of the network device.

20. A non-transitory computer-readable medium comprising instructions for causing one or more programmable processors of a network device to:
configure, by a first application executed by a control plane of the network device and via a first interface executed by a forwarding unit of the network device, an internal forwarding path of the forwarding unit with a sandbox that comprises a container for instructions to be configured inline within the internal forwarding path, and
wherein at least a portion of the internal forwarding path is stored to a memory of the forwarding unit and is executable by a packet processor of the forwarding unit;
configure, by the first application, a socket for the sandbox;
configure, by a second application executed by the control plane of the network device and via a second interface executed by the forwarding unit of the network device, the sandbox with instructions for the sandbox; and
process, by the packet processor, a packet received by the forwarding unit using the instructions for the sandbox to cause the forwarding unit to send the packet to the second application via the socket.

* * * * *